United States Patent
Butikofer et al.

(10) Patent No.: US 7,435,022 B2
(45) Date of Patent: Oct. 14, 2008

(54) APPARATUS AND METHOD TO AVOID DETECTING OUTPUT MOTION AND MEDIA MOVEMENT

(75) Inventors: Chet M. Butikofer, Meridian, ID (US); Roman T. Wachter, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 10/886,754

(22) Filed: Jul. 8, 2004

(65) Prior Publication Data

US 2004/0240002 A1    Dec. 2, 2004

Related U.S. Application Data

(62) Division of application No. 10/269,785, filed on Oct. 11, 2002, now Pat. No. 6,786,662.

(51) Int. Cl.
  *B41J 29/00* (2006.01)
  *B41J 29/38* (2006.01)
  *B65H 43/00* (2006.01)
  *G03G 21/00* (2006.01)
(52) U.S. Cl. .................. 400/578; 400/693; 399/405
(58) Field of Classification Search .................. 400/713
  See application file for complete search history.

(56) References Cited

U.S. PATENT DOCUMENTS

| | | | |
|---|---|---|---|
| 3,747,735 A | 7/1973 | Frick | |
| 3,785,452 A | 1/1974 | Scott | |
| 3,901,372 A | 8/1975 | Denley | |
| 3,912,069 A | 10/1975 | Faulhaber | |
| 3,930,559 A | 1/1976 | Frick | |
| 4,215,762 A | 8/1980 | Cunningham et al. | |
| 4,330,219 A | 5/1982 | Miyasaka et al. | |
| 4,726,699 A | 2/1988 | Buschmann et al. | |
| 4,930,917 A | 6/1990 | Watahiki et al. | |
| 5,000,595 A | 3/1991 | Koike et al. | |
| 5,121,811 A | 6/1992 | Shima et al. | |
| 5,417,488 A | 5/1995 | Horton | |
| 5,669,725 A | 9/1997 | Koshiishi et al. | |
| 5,729,791 A * | 3/1998 | Kutsuwada et al. | 399/82 |
| 5,865,119 A | 2/1999 | Michalik | |
| 2001/0039893 A1* | 11/2001 | Kawakami et al. | 101/288 |
| 2003/0137686 A1* | 7/2003 | Carlson | 358/1.14 |
| 2005/0200882 A9* | 9/2005 | Weinberger et al. | 358/1.15 |

FOREIGN PATENT DOCUMENTS

JP    07195798 A  *  8/1995

* cited by examiner

*Primary Examiner*—Daniel J Colilla

(57) ABSTRACT

This invention relates to a cover attached to an output device that is connected to an imaging device. The purpose for this cover is to avoid output motion and media movement detection in high security areas, such as banks, insurance companies or the like. Such structures of this type, generally, provide an alert mechanism to the imaging device to forward the printed output to the covered output device.

15 Claims, 2 Drawing Sheets

APPARATUS AND METHOD TO AVOID DETECTING OUTPUT MOTION AND MEDIA MOVEMENT

CROSS REFERENCE TO RELATED APPLICATIONS

This Application is a divisional of Application No: 10/269,785, filed Oct. 11, 2002 now U.S. Pat. No. 6,786,662 and is hereby incorporated by reference herein.

BACKGROUND OF THE INVENTION

1. Field of the Invention

This invention relates to a cover attached to an output device that is connected to an imaging device. The purpose for this cover is to avoid output motion and media movement detection in high security areas, such as banks, insurance companies or the like. Such structures of this type, generally, provide an alert mechanism to the imaging device to forward the printed output to the covered output device.

2. Description of the Related Art

Prior to the present invention, as set forth in general terms above and more specifically below, it is known, in the imaging art, to employ a secure media output bin to ensure the security and confidentiality of media output from media-handling devices. Exemplary of such prior art is U.S. Pat. No. 5,417,488 ('488) to H. M. Horton, entitled "Mechanical Security Apparatus for Facsimile Machines." The '488 reference is concerned with providing a covered, secure receptacle portion adapted to receive and retain paper output from facsimile machines, so as to ensure the security and confidentiality of paper output from facsimile machines, so that paper output is not accessed or read except by persons authorized to do so. While the '488 reference provides a secure receptacle portion, this reference is not at all concerned with providing output and media movement motion detection. Consequently, a more advantageous system, then, would be provided if the cover could utilize media output and media movement motion detection for the media-handling device.

It is also known, in the imaging art, to provide a variety of noise-reducing covers for media-handling devices that employ viewing windows or the like. Exemplary of such prior art are U.S. Pat. No. 3,747,735 ('735) to B. E. Frick, entitled "Noise-Reducing Covers for Teleprinters and Other Machines," U.S. Pat. No. 3,785,452 ('452) to C. H. Scott, entitled "Keypunch Acoustic Cover," U.S. Pat. No. 4,215,762 ('762) to D. R. Cunningham et al., entitled "Acoustical Enclosure," and U.S. Pat. No. 5,669,725 ('725) to O. Koshiishi et al., entitled "Impact Dot Printer with Noise Suppression." The '735, '452, '762, and '725 references are concerned with employing a noise suppression cover for media-handling devices such that the cover also includes a viewing window for observing the media. While these references are concerned with noise reduction, the viewing window allows for the motion of the media to be detected. Therefore, a further advantageous system, then, would utilize a cover that would eliminate the output and media movement motion detection of the media-handling device.

It is further known, in the imaging art, to provide a variety of noise-reducing covers for media-handling devices. Exemplary of such prior art are U.S. Pat. No. 3,912,069 ('069) to R. Faulhaber, entitled "Sound Confining Typewriter Cover," U.S. Pat. No. 3,930,559 ('559) to B. E. Frick, entitled "Sound Insulating Hoods for Noise Emitting Apparatus," U.S. Pat. No. 4,726,699 ('699) to U. Buschmann et al., entitled "Noise Attenuation in Printers," U.S. Pat. No. 4,930,917 ('917) to S. Watahiki et al., entitled "Soundproof Construction in Printer Box," U.S. Pat. No. 5,121,811 ('811) to H. Shima et al., entitled "Noise Reducing Device for Printer," and U.S. Pat. No. 5,865,119 ('119) to H. B. Michalik, entitled "Soundproofing." The '069, '559, '699, '917, '811, and '119 references employ a variety of noise attenuation covers for media-handling devices. While these covers are capable of eliminating/reducing noise that emanates from the media-handling device, the attachment of the cover to the media-handling device does not alert the media-handling device to forward the printed document to the covered portion of the media-handling device.

It is apparent from the above that there exists a need in the art for a cover for a media-handling device that is capable of reducing/eliminating the detection of output and media movement detection, but which at the same time provides a notification to the media-handling device to forward the printed document to the covered portion of the media-handling device. It is a purpose of this invention to fulfill this and other needs in the art in a manner more apparent to the skilled artisan once given the following disclosure.

SUMMARY OF THE INVENTION

Generally speaking, this invention fulfills these needs by providing an apparatus for avoiding the detection of output and media movement, wherein the apparatus is comprised of: an imaging device; a media-handling device operatively connected to the imaging device such that the media-handling device includes at least one media output bin; and a cover located substantially over the media output bin such that substantially any motion associated with a movement of the output bin and a movement of media into the output bin is undetectable outside of the cover.

In certain preferred embodiments, the apparatus further includes a notification means to notify the imaging device that the cover has been placed upon the media-handling device so that the document printed by the imaging device will be forwarded to the covered media output bin. Also, the cover can be constructed of any suitable, durable, lightweight, opaque material. Transparent material may be used for some motion detectors such as those that only use ultrasonic waves to detect motion. Finally, when the cover is installed and the notification means is activated, the imaging device and/or the media-handling device can disable all externally viewable moving parts and then turn the control panel and all blinking LEDs off so that these light emitting parts do not set off security devices.

In another preferred embodiment, the apparatus includes a notification means to notify the security system of the position of the imaging device that the cover is being attached to. The security system can also be notified of the start and end time of all jobs being printed with that imaging device. Motion detectors that use infrared technology to detect motion are often tricked by imaging devices. Infrared technology senses the presence of heat or warm air. Most imaging devices exhaust warm air during and after printing. Therefore, when a security cover is installed, if the imaging device can notify the security system of its presence and task time, the security system can take this into account.

In another further preferred embodiment, the lightweight, opaque (in some cases transparent) cover is attached to a media-handling device in order to cover at least one output bin. In this manner, when the cover is attached to the media-handling device, a sensor will detect the cover's presence and route all print jobs to the covered output bin. This will ensure that the face down output bin will not receive any print jobs and, thereby, set off motion detectors.

In still further preferred embodiment, a lightweight cover is attached to the printer's face down bin. A sensor will detect the cover's presence and route all print jobs to the covered face down bin. The advantage of this cover is that it is much smaller than a cover for the entire output device. However, it may also be added in addition to the output device cover. This allows the imaging device more output capacity during high security hours.

The preferred media-handling device cover, according to this invention, offers the following advantages: ease-of-use; lightness in weight; excellent durability; increased security; decreased output motion detection; decreased media movement detection; and excellent economy. In fact, in many of the preferred embodiments, these factors of ease-of-use, lightness in weight, durability, security, decreased output motion detection, decreased media movement detection, and economy are optimized to an extent that is considerably higher than heretofore achieved in prior, known media-handling device covers.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
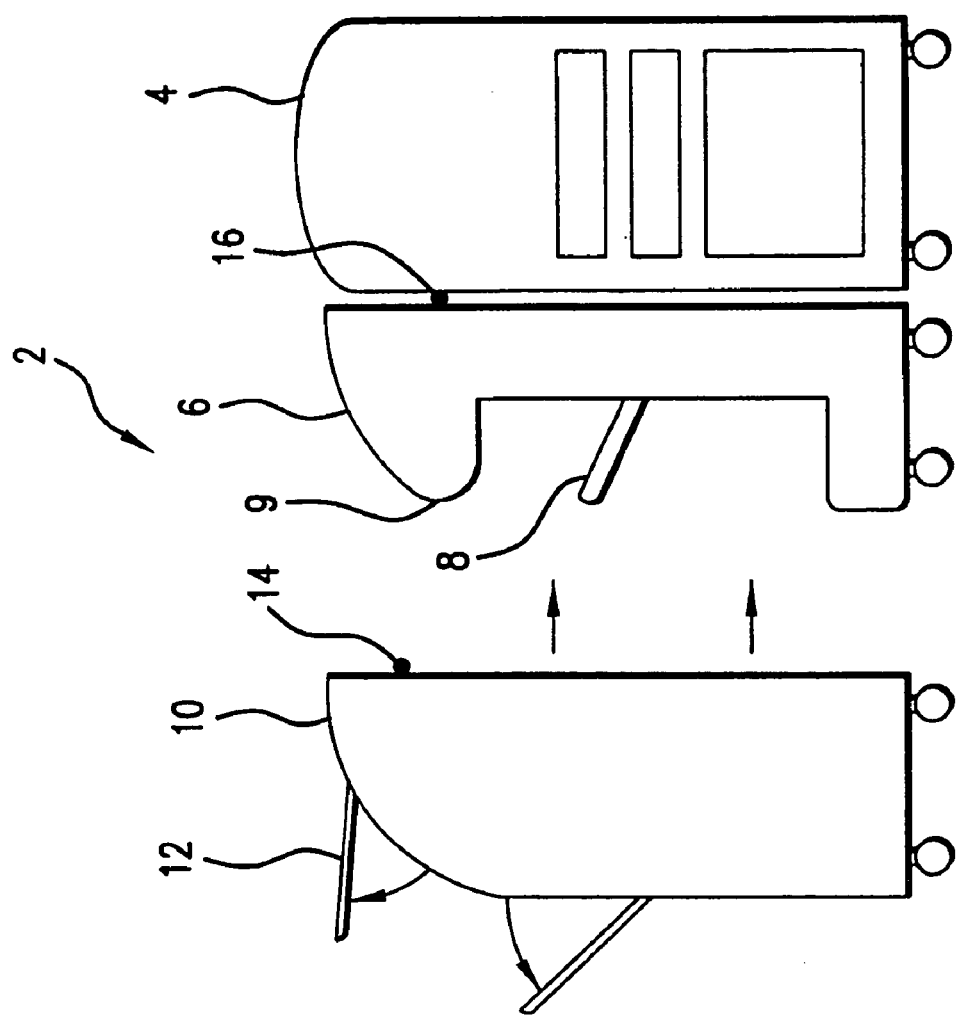
FIG. 1 is a schematic illustration of an apparatus for avoiding the detection of output motion and media movement, according to one embodiment of the present invention.

With reference first to FIG. 1, there is illustrated one preferred embodiment for use of the concepts of this invention. FIG. 1 is a schematic illustration of an apparatus 2 for avoiding the detection of output motion and media movement. Apparatus 2 includes, in part, imaging device 4, conventional output device 6, conventional output bin 8, media 9, cover 10, doors 12, and sensors 14, 16.

Although the various embodiments of the invention disclosed herein will be described with reference to apparatus 2 shown schematically in FIG. 1, the invention is not limited to use with apparatus 2. The invention may be implemented in or used with any computer system in which it is necessary or desirable to access electronic data.

Imaging device 4 is any suitable device that is capable of rendering an image upon media 9.

Output device 6 is a conventional output device that is capable of handling media 9 upon which the image has been rendered. Preferably, output device 6 contains at least one output bin 8. In this manner, media 9, upon which the image has been rendered, will be forwarded to output bin 8. It is to be understood that output device 6 can contain a plurality of output bins 8 that can be utilized to handle a variety of rendered media 9.

Cover 10, preferably, is constructed of any suitable, durable, lightweight, opaque material. It is to be understood that cover 10 must function to keep the motion of output bin 8 and the movement of media 9 in output bin 8 from being detected. Also, it is to be understood that cover 10 can be constructed so as to only cover a portion of output device 6. For example, cover 10 can be made smaller in order to only one cover output bin 8. In this manner, rendered media 9 can be forwarded to other output bins 8 that are located outside of cover 10 so that the user does not have to remove cover 10. This would be particularly useful when the rendered media 9 is printed during the daytime or when the security system, including motion detectors, is not active. To accomplish this, the imaging device may be notified, through the network, by the security system when motion detectors are active and when they are inactive. This type of automated system would greatly increase ease of use of the security cover.

Cover 10 can be provided with optional doors 12 that would allow the user to retrieve the rendered print jobs from output bin 8 without having to remove cover 10 from output device 6.

Sensors 14 and 16 can be located on cover 10 and imaging device 4, respectively. Sensors 14 and 16 can be used to alert imaging device 4 that cover 10 has been placed over output device 6. In this manner, any document rendered by imaging device 4 will be forwarded only to the output bin 8 that has been covered by cover 10. Also, once imaging device 4 has been alerted that cover 10 has been placed over output device 6, imaging device 4 and/or media-handling device 6 may disable any externally viewable moving parts, and then turn the control panel (not shown) and all blinking LEDs (not shown) off so that these light emitting parts did not set off security devices, such as motion detectors.

Figure 2:
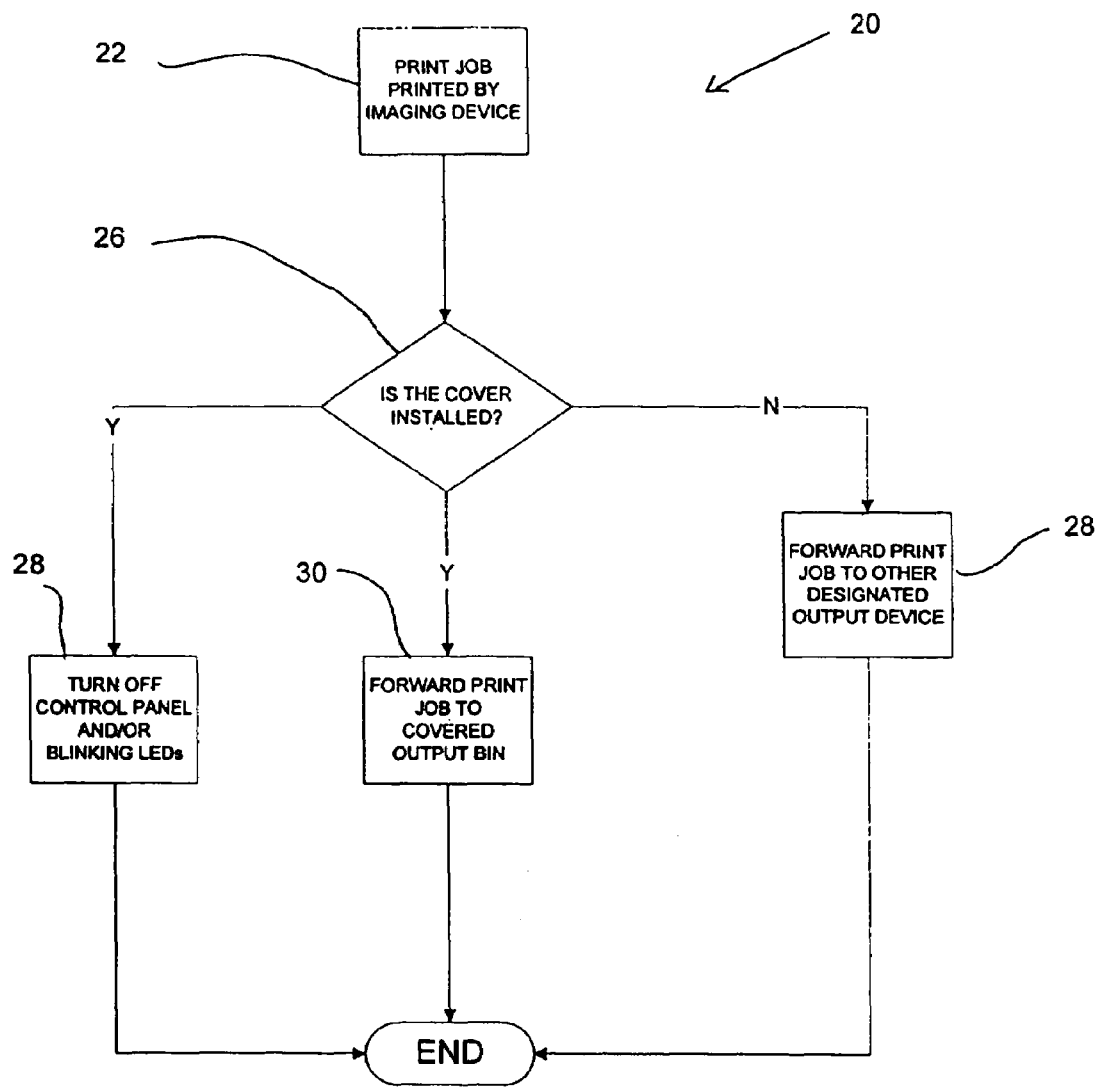
FIG. 2 is a flowchart of a method for avoiding the detection of output motion and media movement, according to one embodiment of the present invention.

FIG. 2 illustrates method 20 for avoiding the detection of output motion and media movement. Method 20 includes, in part, the steps of: rendering the print job onto the media by the imaging device (step 22); determining if the cover has been installed on the output device (step 24); forwarding the print job to another designated output device (step 26); turning the control panel (not shown) and all blinking LEDs (not shown) off; and forwarding the rendered media to the output bin of the covered output device (step 30).

With respect to step 22, the print job is conventionally rendered by imaging device 4 (FIG. 1) upon media 9. With respect to step 24, sensors 14 and 16 are utilized in order to determine if cover 10 is covering output device 6 and operatively connected to imaging device 4.

With respect to step 26, if cover 10 is not located over output device 6 and operatively connected to imaging device 4, for example, an alert can be forwarded to a system administrator to notify the system administrator that apparatus 2 cannot render security documents because output device 6 is not covered. If the system administrator so desires, the system administrator may then forward the print job to another secure imaging device or another output bin 8 on output device 6 that is not covered. Also, the system administrator may go to apparatus 2 and secure cover 10 over output device 6.

With respect to step 28, once cover 10 has been a located over output device 6 and operatively connected to device 4, the control panel (not shown) and all blinking LEDs (not shown) in imaging device 4 and/or media-handling device 6 could be turned off in order to avoid setting off any security devices, especially those security devices that detect motion.

With respect to step 30, if cover 10 is properly located over output device 6 and operatively connected to imaging device 4, then rendered media 9 can be forwarded to covered output bin 8.

It is to be understood that the flowchart of the FIGURE shows the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction execution system such as a computer/processor based system or other system that can fetch or obtain the logic from the computer-readable medium and execute instructions contained therein. A "computer-readable medium" can be any medium that contains, stores, or maintains programming for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the flowchart of FIG. 2 shows a specific order of execution, the order of execution may differ from that which is depicted. For example, the order of execution of two or more blocks may be scrambled relative to the order shown. Also, two or more blocks shown in succession in FIG. 2 may be executed concurrently or with partial concurrence. All such variations are within the scope of the present invention.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for avoiding the detection of output and media movement, comprising the steps of:
   rendering a print job onto media by an imaging device;
   determining if a cover is installed over an output bin operatively connected to said imaging device;
   forwarding said rendered media to said output bin if said cover is installed; and
   forwarding said print job to another imaging device if said cover is not installed.

2. A method for avoiding the detection of output and media movement, comprising the steps of:
   rendering a print job onto media by an imaging device:
   determining if a cover is installed over an output bin operatively connected to said imaging device;
   forwarding said rendered media to said output bin if said cover is installed; and
   forwarding said print job to another imaging device if said cover is not installed,
   wherein said determining step is further comprised of the step of:
   determining if sensors located on said cover and said imaging device are activated.

3. The method, as in claim 2, wherein said method is further comprised of the step of:
   removing said rendered media from said output bin through at least one door located on said cover.

4. The method, as in claim 2, wherein said method is further comprised of the step of:
   shutting off a control panel located on said imaging device; and
   shutting off substantially all blinking LEDs located on said imaging device.

5. The method, as in claim 2, wherein said determining step is further comprised of the step of:
   notifying a system administrator that said cover is not installed over said output device.

6. A computer readable medium, having instructions for avoiding the detection of output and media movement, comprising the steps of:
   rendering a print job onto media by an imaging device;
   determining if a cover is installed over an output bin operatively connected to said imaging device;
   forwarding said rendered media to said output bin if said cover is installed; and
   forwarding said print job to another imaging device if said cover is not installed.

7. The computer readable medium, as in claim 6, wherein said determining step is further comprised of the step of:
   determining if sensors located on said cover and said imaging device are activated.

8. The computer readable medium, as in claim 6, wherein said method is further comprised of the step of:
   removing said rendered media from said output bin through at least one door located on said cover.

9. The computer readable medium, as in claim 6, wherein said method is further comprised of the step of:
   shutting off a control panel located on said imaging device; and
   shutting off substantially all blinking LEDs located on said imaging device.

10. The computer readable medium, as in claim 6, wherein said determining step is further comprised of the step of:
    notifying a system administrator that said cover is not installed over said output device.

11. In a computer network, a method for avoiding the detection of output and media movement, comprising the steps of:
    rendering a print job onto media by an imaging device;
    determining if a cover is installed over an output bin operatively connected to said imaging device;
    forwarding said rendered media to said output bin if said cover is installed; and
    forwarding said print job to another imaging device if said cover is not installed.

12. In a computer network, a method for avoiding the detection of output and media movement, comprising the steps of:
    rendering a print job onto media by an imaging device;
    determining if a cover is installed over an output bin operatively connected to said imaging device;
    forwarding said rendered media to said output bin if said cover is installed; and
    forwarding said print job to another imaging device if said cover is not installed,
    wherein said determining step is further comprised of the step of:
    determining if sensors located on said cover and said imaging device are activated.

13. The computer network, as claim 12, wherein said method is further comprised of the step of:
    removing said rendered media from said output bin through at least one door located on said cover.

14. The computer network, as in claim 12, wherein said method is further comprised of the step of:
    shutting off a control panel located on said imaging device; and
    shutting off substantially all blinking LEDs located on said imaging device.

15. The computer network, as in claim 12, wherein said determining step is further comprised of the step of:
    notifying a system administrator that said cover is not installed over said output device.

* * * * *

UNITED STATES PATENT AND TRADEMARK OFFICE
CERTIFICATE OF CORRECTION

PATENT NO. : 7,435,022 B2  Page 1 of 1
APPLICATION NO. : 10/886754
DATED : October 14, 2008
INVENTOR(S) : Chet M. Butikofer et al.

It is certified that error appears in the above-identified patent and that said Letters Patent is hereby corrected as shown below:

In column 5, line 38, in Claim 2, delete "device:" and insert -- device; --, therefor.

In column 6, line 7, in Claim 6, delete "instailed" and insert -- installed --, therefor.

In column 6, line 49, in Claim 13, after "as" insert -- in --.

Signed and Sealed this

Third Day of March, 2009

JOHN DOLL
*Acting Director of the United States Patent and Trademark Office*